UNITED STATES PATENT OFFICE.

FRANK PICARD, OF FALL RIVER, MASSACHUSETTS.

LIQUID COATING COMPOSITION.

1,281,650.  Specification of Letters Patent.  Patented Oct. 15, 1918.

No Drawing.  Application filed April 22, 1917. Serial No. 164,011.

*To all whom it may concern:*

Be it known that I, FRANK PICARD, a citizen of the United States, residing at Fall River, in the county of Bristol and State of Massachusetts, have invented a new and useful Liquid Coating Composition, of which the following is a specification.

My composition consists of the following ingredients, combined in the proportions stated, viz:

Make a solution of about one hundred pounds composed as follows:

Five (5) per cent. linseed oil,
Five (5) per cent. rosin,
Five (5) per cent. gutta percha,
Five (5) per cent. gum arabic,
Eighty (80) per cent. shellac, then take the one hundred pounds of said solution and mix same with forty (40) gallons of either gasolene or alcohol so that it would test to ten (10) degrees Baumé; the more pliable it is desired to make the product, the more alcohol or gasolene is to be used. Then take any size or thickness of wool-felt or fur-felt and soak the felt in the solution allowing the felt to remain in the solution for about three minutes; then place the felt through rollers and allow same to dry in open air so that alcohol or gasolene will evaporate. Then finish smooth with shellac.

Then cut same to whatever shape or piece is required. The purpose of said composition of matter is to act as a substitute for leather.

I claim:

1. A liquid coating composition comprising linseed oil, rosin, gutta percha, gum arabic, shellac, and a volatile solvent, substantially in the proportions described.

2. A liquid coating composition comprising linseed oil, rosin, gutta percha, gum arabic, shellac and gasolene, substantially in the proportions described.

3. A liquid coating composition comprising 5 parts linseed oil, 5 parts rosin, 5 parts gutta percha, 5 parts gum arabic, 80 parts shellac and gasolene, substantially in the proportion described.

FRANK PICARD.

Witnesses:
ALFRED P. DUMAS,
MOSES ENTIN.